UNITED STATES PATENT OFFICE.

FREDERICK HUDSON, OF PHILADELPHIA, PENNSYLVANIA, ASSIGNOR OF ONE-HALF TO JOSEPH A. MISSAR, OF PHILADELPHIA, PENNSYLVANIA.

PLASTIC COMPOSITION.

1,276,221.  Specification of Letters Patent.  Patented Aug. 20, 1918.

No Drawing.  Application filed May 20, 1918. Serial No. 235,674.

*To all whom it may concern:*

Be it known that I, FREDERICK HUDSON, a subject of the King of Great Britain, residing at Philadelphia, in the county of Philadelphia and State of Pennsylvania, have invented certain new and useful Improvements in Plastic Compositions, of which the following is a specification.

This invention relates to a plastic composition and a method of making the same and has special reference to a plastic composition in the nature of cement and a method of producing the cement.

One of the principal objects of the present invention is the production of a cement which will be entirely waterproof and which will not be affected by the changes of the surrounding atmosphere.

Another object of this invention is the production of an efficient cement which will not shrink or crack after once having been set and which will adhere securely to the supporting means therefor such as wood, iron, stone, brick, glass, china or marble and the like.

A still further object of this invention is the production of a simple and efficient plastic composition in the nature of a cement which will not stain the articles upon which the same is used and when placed upon a stone of a very soft nature the oils will not spread as is the case with many plastic compositions of a similar nature.

Other objects and advantages of the present composition and the method of compounding the same will appear throughout the following specification and claims.

The present plastic composition comprises 99 parts of burnt sand, crushed fire brick, crushed marble, crushed clay, crushed granite or any other suitable kind of stone and 1 part of litharge powder, the litharge being in a powdered form in the nature of lead monoxid (PbO). The above mixture is then mixed thoroughly together with the following: Chinese wood oil, 50 parts, kerosene oil, 35 parts, and benzin, 15 parts. The three oils above mentioned are thoroughly mixed with the burnt sand, crushed fire brick and the like and the litharge in powdered form to form an efficient cement in a pasty form of consistency.

In producing the composition above set forth, I proceed in the following manner:

I first heat the sand to a red heat for the purpose of removing all vegetable and organic matter. The other materials to be mixed with the sand are common brick, fire brick, glass, marble or any other suitable kind of stone which is thoroughly crushed fine enough to pass easily through a sieve having a $\frac{1}{64}$ of an inch mesh for the purpose of producing a very fine powder. This powdered sand and stone is then mixed with the litharge, one pound of litharge being applied for every ninety pounds of sand or stone and the like. I have found by experience that it is preferable to employ ninety pounds of crushed brick, slag and stone with nine pounds of burnt sand and one pound of litharge, for the reason that by experience I have found that the mixture hardens more readily by being compounded as above set forth.

After the three ingredients, sand, litharge, and powdered stone, have been thoroughly mixed, I then mix the Chinese wood oil together with the kerosene and benzin with the powdered substance above enumerated by applying approximately one quart of oil to eight pounds of the dry powdered mixture. The ingredients are then thoroughly mixed together until a paste-like cement has been produced. This mixture is then permitted to stand for four hours to allow the gases to escape partially before packing. The paste is then thoroughly and efficiently packed in air-tight friction top cans for the purpose of shipping the same and for the purpose of selling the article conveniently.

It should be further understood that the present plastic composition in the nature of a cement may be also used as a waterproof paint if so desired by adding an additional amount of oil to the composition. When it is desired to use the cement, the same may be applied by pointing trowel and the length of time which is required for hardening depends largely upon the condition of the surrounding atmosphere. When subjected to ordinary atmospheric conditions, approximately fourteen days are required for the cement to properly set and harden. However, when subjected to artificial drying means where artificial heat is employed adjacent the parts which have been cemented, the same will readily dry and harden within a few hours.

From the foregoing description it will be seen that a very simple and efficient means has been produced whereby a number of ingredients may be readily compounded for the purpose of producing a cement which may be very easily worked and applied to work requiring a hard waterproof surface which is not affected by the changing of the surrounding atmosphere. It will be further understood that a very simple composition has been produced which, after once becoming hard, will not crack or shrink and which will readily adhere to the surface upon which it has been applied.

It should be further understood that certain changes may be made in the proportion of the ingredients employed in connection with the present composition and the method of compounding the same without departing from the spirit thereof so long as these changes fall within the scope of the appended claims.

In the following claims where the expression powdered stone is used, it is intended that this expression or term cover powdered stone of any nature such for instance as crushed fire-brick, crushed marble, crushed slag, crushed granite and crushed brick and stone of any kind whatever.

Having thus described my invention what I claim as new is:

1. A plastic composition comprising sand and powdered stone thoroughly mixed with litharge (PbO) in suitable proportions, the above being mixed with Chinese wood oil, kerosene oil and benzin.

2. A plastic composition comprising a mixture of burnt sand and powdered stone mixed with litharge (PbO), the above being thoroughly mixed with oil comprising Chinese wood oil, kerosene and benzin.

3. A plastic composition comprising a mixture of 99 parts of burnt sand and crushed stone and one part of litharge in powdered form, the above being mixed with an oil consisting of Chinese wood oil 50 parts, kerosene 35 parts and benzin 15 parts.

4. A plastic composition comprising a mixture of 90 pounds of powdered stone, 9 pounds of burnt sand, and one pound of litharge, mixed with 50 parts of Chinese wood oil, 35 parts of kerosene and 15 parts of benzin, approximately one quart of oil being added to every eight pounds of powder.

5. A process of making a plastic composition which consists in burning sand to a red heat, then crushing stone to the consistency of powder, then mixing the sand and powdered stone with litharge, then mixing the above in a proportion of eight pounds to one quart of an oil consisting of Chinese wood oil, kerosene and benzin.

6. A process of making a plastic composition which consists in burning sand to a red heat (9 pounds), then mixing the same with powdered stone 90 pounds, and litharge one pound, then mixing the above in a proportion of eight pounds of powder to 1 quart of oil, the oil consisting of Chinese wood oil 50 parts, kerosene oil 35 parts and benzin 15 parts.

In testimony whereof I affix my signature in presence of two witnesses.

FREDERICK HUDSON.

Witnesses:
JOSEPH A. MISSAR,
FREDERICK OTTLEY.

Copies of this patent may be obtained for five cents each, by addressing the "Commissioner of Patents, Washington, D. C."